(No Model.) 7 Sheets—Sheet 1.

J. B. BROLASKI.
KNOCKDOWN FURNITURE.

No. 325,049. Patented Aug. 25, 1885.

WITNESSES:
INVENTOR: J. B. Brolaski
BY Munn & Co
ATTORNEYS.

(No Model.)  
7 Sheets—Sheet 2.
J. B. BROLASKI.
KNOCKDOWN FURNITURE.
No. 325,049. Patented Aug. 25, 1885.
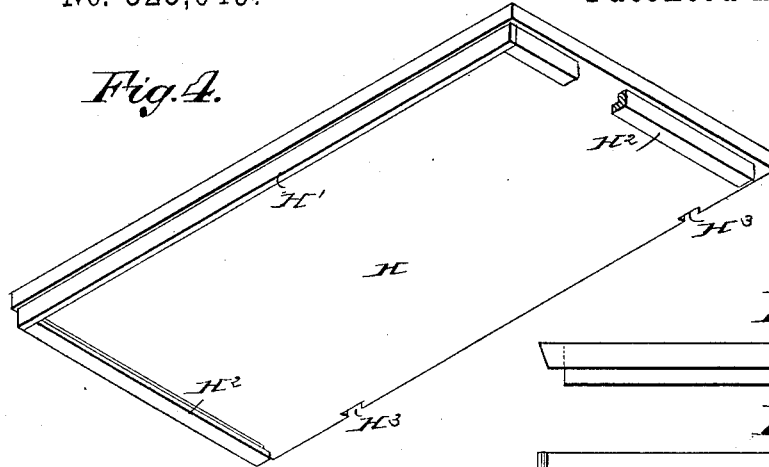
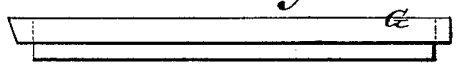
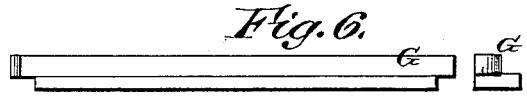
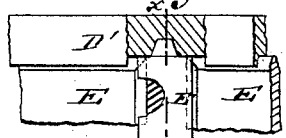 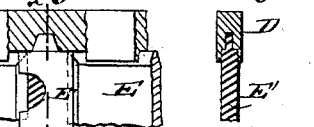
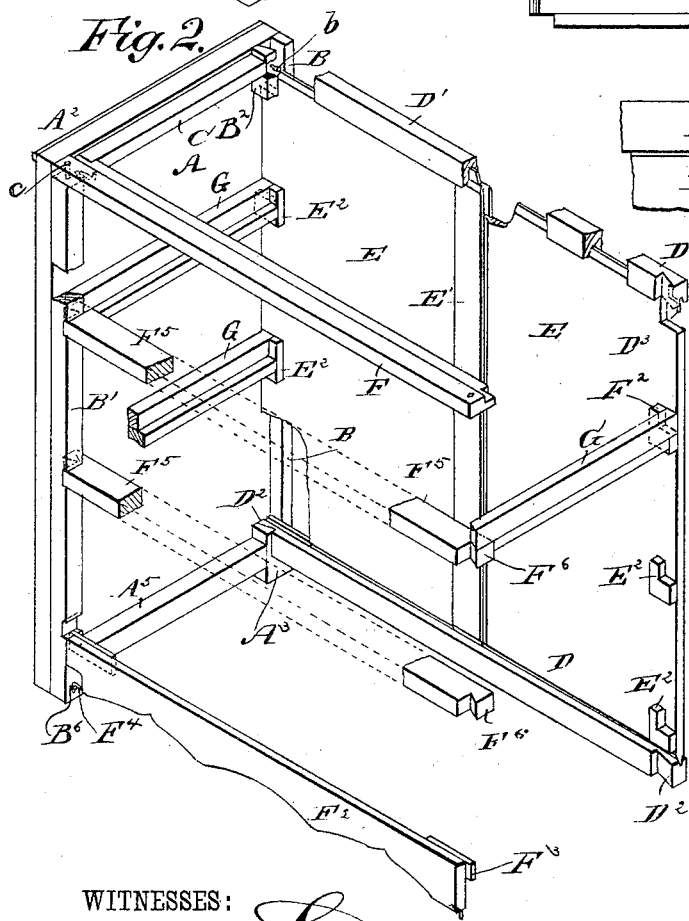
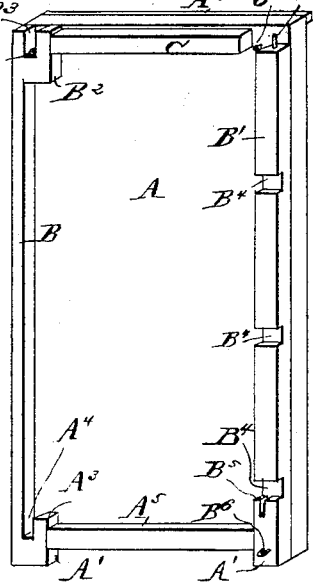
WITNESSES:
INVENTOR:
J. B. Brolaski
BY Munn & Co.
ATTORNEYS.
N. PETERS, Photo-Lithographer, Washington, D. C.

(No Model.) 7 Sheets—Sheet 3.
J. B. BROLASKI.
KNOCKDOWN FURNITURE.
No. 325,049. Patented Aug. 25, 1885.
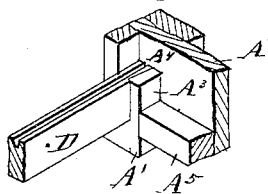
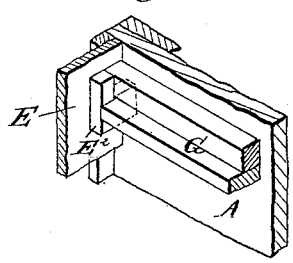
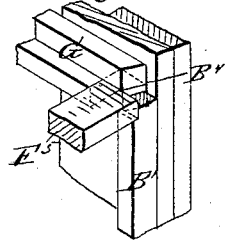
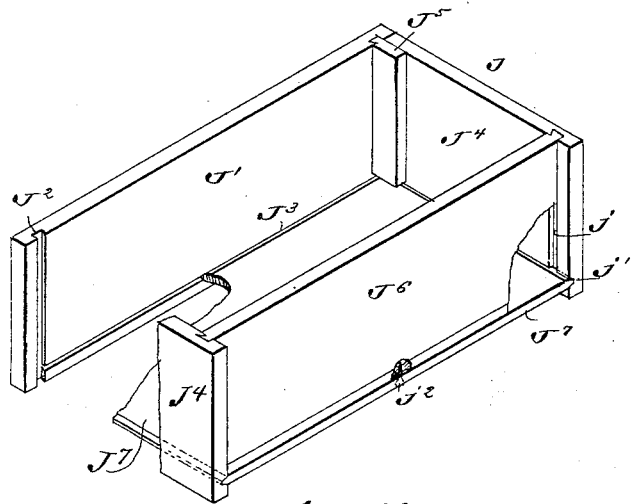
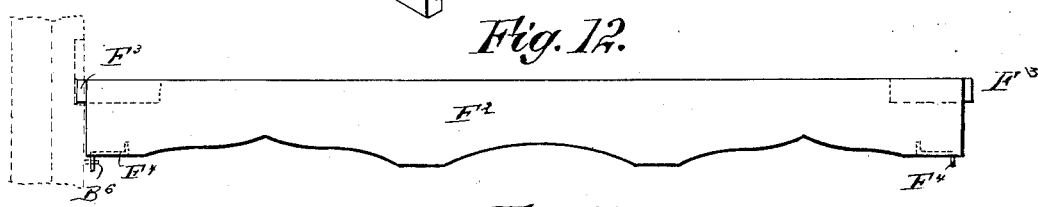
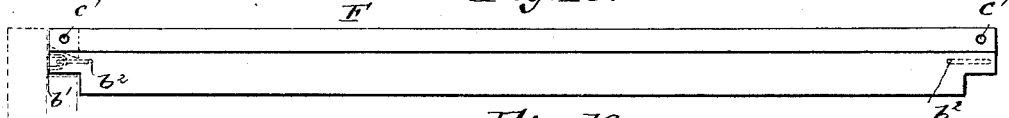
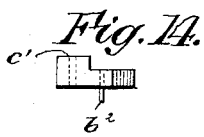
WITNESSES:
Otto Beyer
C. Sedgwick
INVENTOR:
J. B. Brolaski
BY Munn & Co
ATTORNEYS.
N. PETERS. Photo-Lithographer, Washington, D. C.

(No Model.) 7 Sheets—Sheet 4.
J. B. BROLASKI.
KNOCKDOWN FURNITURE.
No. 325,049. Patented Aug. 25, 1885.
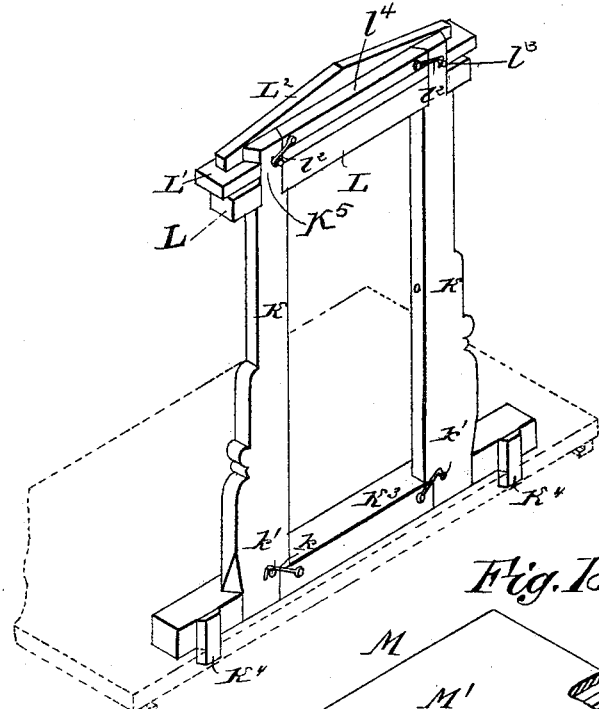
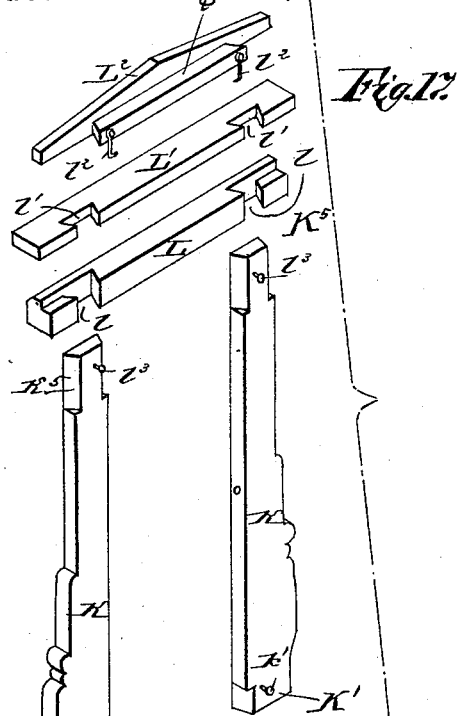
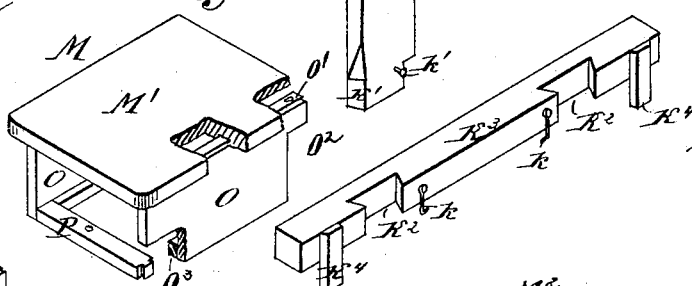
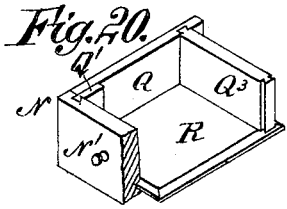
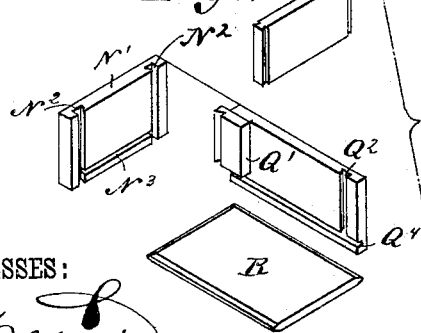
WITNESSES:
INVENTOR:
J. B. Brolaski
BY Munn & Co
ATTORNEYS.

(No Model.) 7 Sheets—Sheet 5.

J. B. BROLASKI.
KNOCKDOWN FURNITURE.

No. 325,049. Patented Aug. 25, 1885.

WITNESSES:
Otto Beyer
C. Sedgwick

INVENTOR:
J. B. Brolaski
BY Munn & Co.
ATTORNEYS.

(No Model.) 7 Sheets—Sheet 6.

J. B. BROLASKI.
KNOCKDOWN FURNITURE.

No. 325,049. Patented Aug. 25, 1885.

WITNESSES:
Otto Berger
C. Sedgwick

INVENTOR:
J. B. Brolaski
BY Munn & Co.
ATTORNEYS.

(No Model.) 7 Sheets—Sheet 7.

J. B. BROLASKI.
KNOCKDOWN FURNITURE.

No. 325,049. Patented Aug. 25, 1885.

WITNESSES:

INVENTOR:
J. B. Brolaski
BY Munn & Co
ATTORNEYS.

UNITED STATES PATENT OFFICE.

JOSEPH B. BROLASKI, OF ST. LOUIS, MISSOURI.

KNOCKDOWN FURNITURE.

SPECIFICATION forming part of Letters Patent No. 325,049, dated August 25, 1885.

Application filed October 10, 1884. (No model.)

*To all whom it may concern:*

Be it known that I, JOSEPH B. BROLASKI, of St. Louis, Missouri, have invented certain new and useful Improvements in Knockdown Furniture, of which the following is a full, clear, and exact description.

The object of my invention is to provide certain new and useful improvements in various articles of household furniture—such as bureaus, wash-stands, sideboards, kitchen-safes, desks, &c.—which articles of furniture may be so constructed that they can be folded very compactly for transportation, can be erected or taken apart easily and rapidly, and stand very rigidly and firmly when erected.

This invention, which is an improvement on the knockdown furniture for which United States Letters Patent No. 298,821 were issued to me on the 20th day of May, 1884, consists in the improved construction and arrangement of parts and details and combinations of the same, as will be fully described and set forth hereinafter.

Reference is to be had to the accompanying drawings, forming part of this specification, in which similar letters of reference indicate corresponding parts in all the figures.

Figure 1:
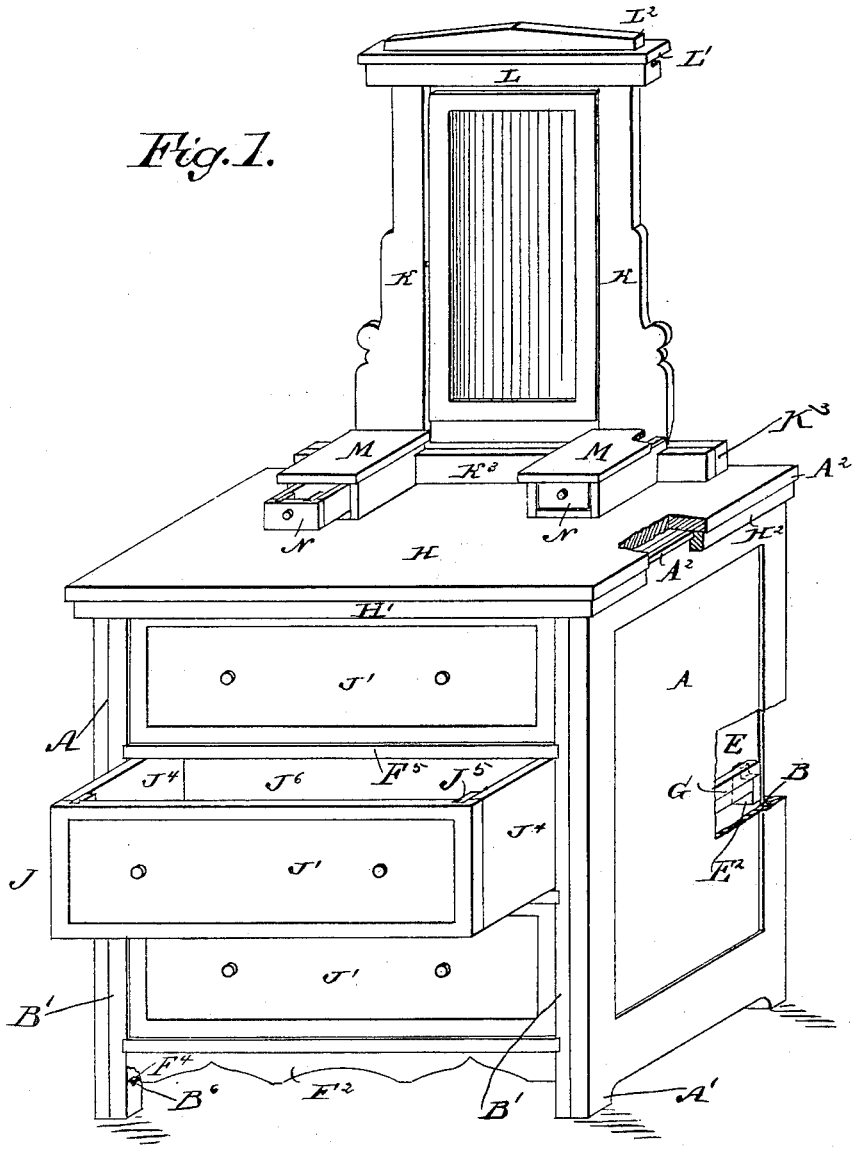
Figure 22:
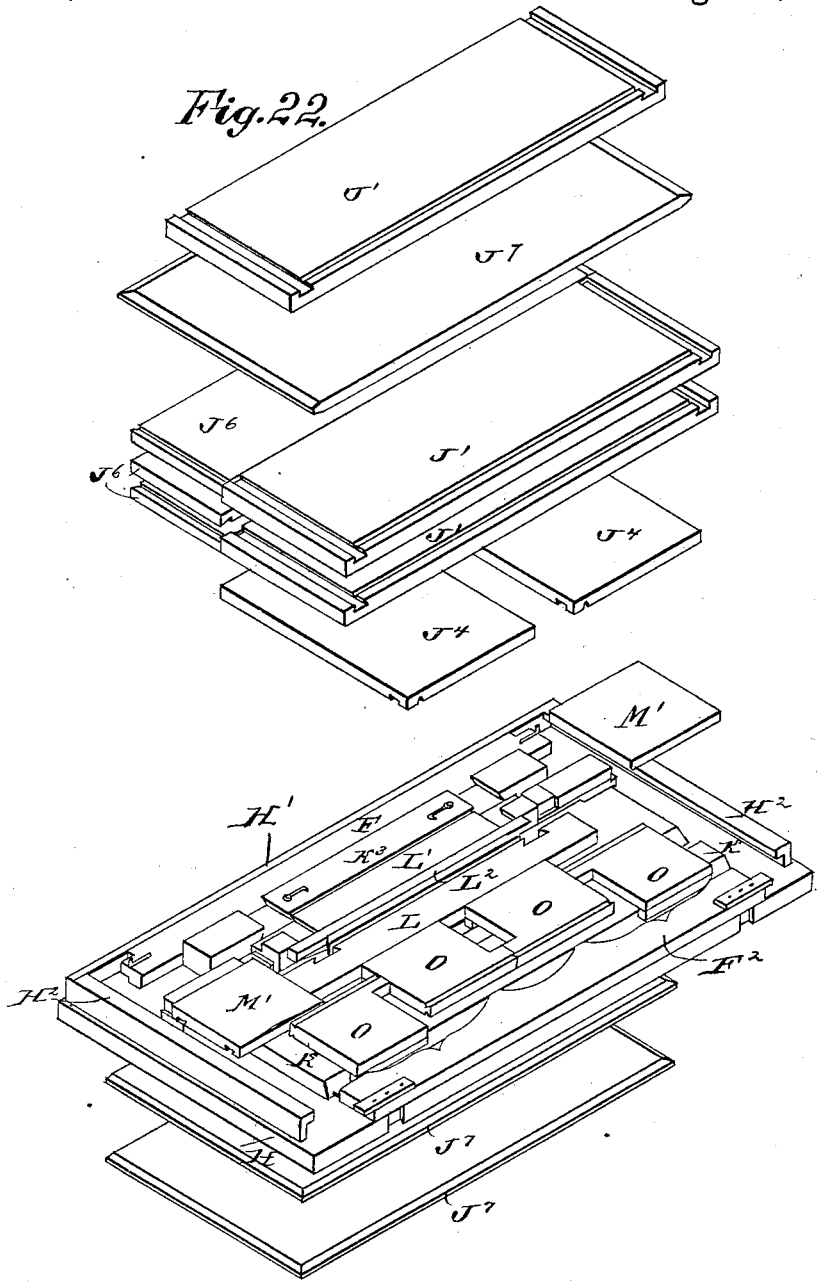
Figure 23:
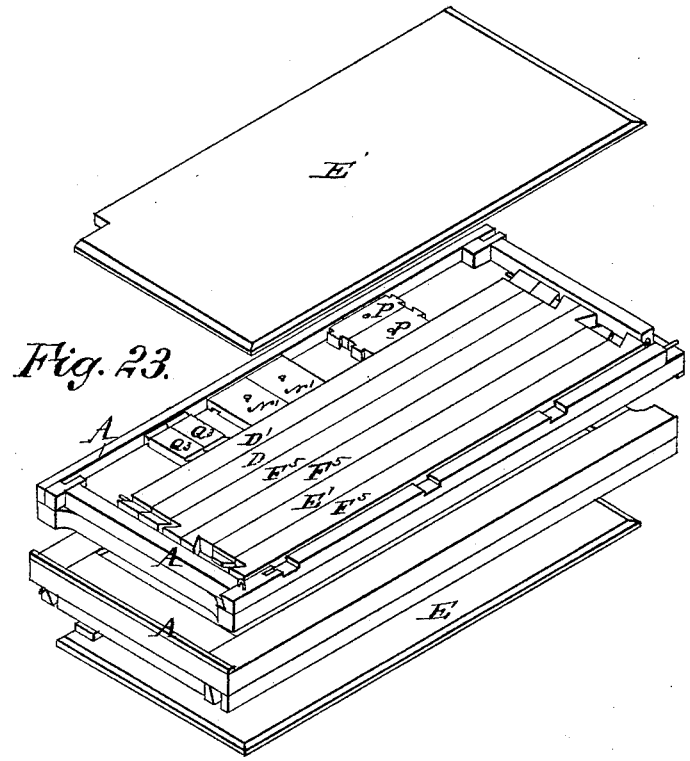
Figure 24:
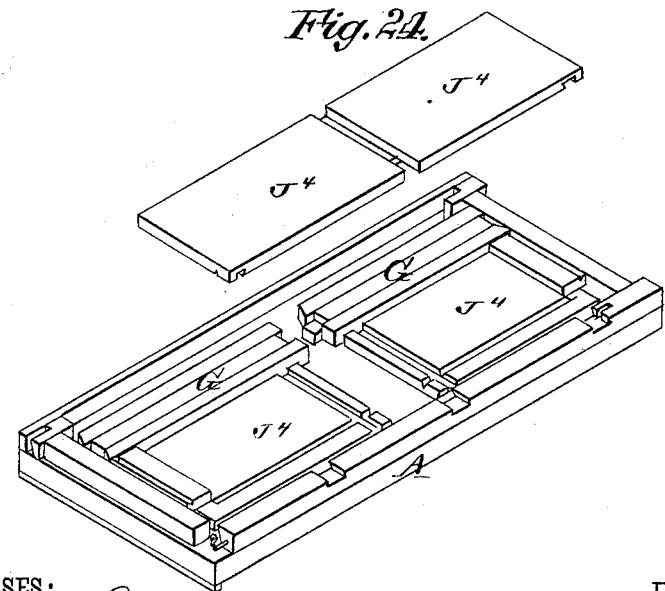
Figure 25:
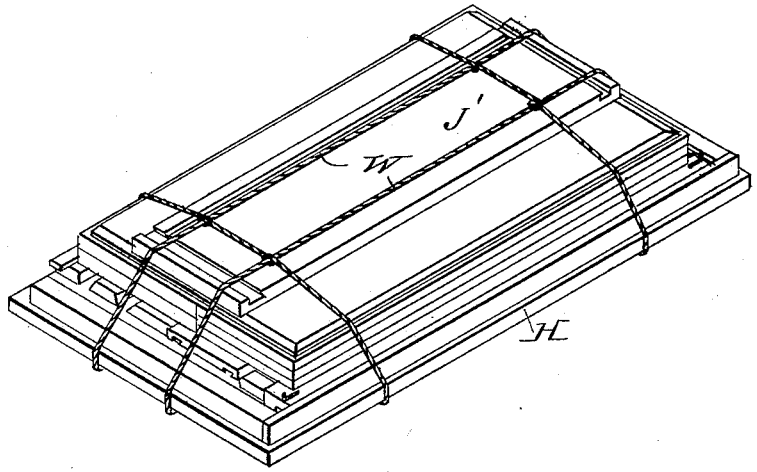
Figure 26:
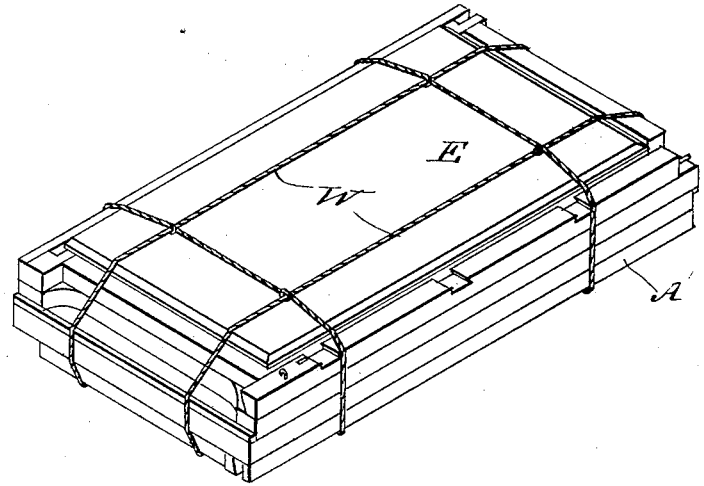

Figure 1 is a perspective view of a bureau constructed on the principle of my improved knockdown furniture, parts being broken out and others shown in section. Fig. 2 is a perspective view of the skeleton of the bureau, parts being broken out and others shown in section and others removed. Fig. 3 is an inside perspective view of one of the upright end pieces. Fig. 4 is a bottom perspective view of the top plate of the bureau, parts being broken out. Fig. 5 is a plan view of one drawer-cleat. Fig. 6 shows a longitudinal side and an end elevation of the same. Fig. 7 is an enlarged detail sectional elevation of the joint of the middle standard and top rail of the back. Fig. 8 is a cross-sectional elevation of the same on the line $x\ x$, Fig. 7. Fig. 9 is an enlarged detail inside perspective view of one lower rear corner of the frame. Fig. 10 is an enlarged detail perspective view of one corner part of the frame, showing the manner of holding the drawer-cleats. Fig. 11 is an enlarged detail perspective view of one corner, showing the connection between the drawer-cleats and the front bars supporting the drawers. Fig. 12 is a longitudinal elevation of the ornamental bottom board on the front of the bureau. Fig. 13 is a plan view of the front top rail of the frame. Fig. 14 is an end view of the same. Fig. 15 is a rear inside perspective view of one of the drawers, parts being broken out and others shown in section. Fig. 16 is a rear perspective view of the mirror-holding frame. Fig. 17 is a perspective view of the same, showing the parts detached. Fig. 18 is a perspective view of one of the cases or boxes on the top of the bureau, parts being broken out and others shown in section. Fig. 19 represents the parts of the same in detail perspective views. Fig. 20 is a detail perspective view of one of the drawers for the boxes upon the top of the bureau, parts being broken out and others shown in section. Fig. 21 shows details of the parts of the same in perspective views. Fig. 22 shows parts of the bureau in the positions in which they are placed for packing. Figs. 23 and 24 show the other parts in like positions. Figs. 25 and 26 are perspective views of the bundles or packages formed of the several parts ready for transportation.

The bureau is constructed with a skeleton frame, on which the other parts are held. Two end pieces, A, are provided with short legs A', in the usual manner, and on the outer surface a transverse ledge, A², is formed along the upper edge of each end piece. On the inner surface of each end piece strips B' and B are secured along the front and rear edges and flush with the same, of which upright strips the front one, B', has its inner edge dovetailed.

At the upper end of the rear strip, B, a block, B², is provided, having a dovetailed mortise, B³, in its top, in the bottom of which mortise an eye, $b$, is held. A strip or cleat, C, is secured on the inner surface of each end piece, A, parallel with the top edge and slightly below the same, which strip or cleat extends to within a short distance from the beveled longitudinal edge of the front upright, B'. An eye, $b'$, projects from the inner surface of the end piece, A, between the end of the upright B' and the cleat or strip C. The top of the upright B' does not project above the bottom edge of the cleat or strip C, and a pin, $c$, projects from the upper end of the upright $B'$.

The front upright, $B'$, is provided in its inner side with a series of notches, $B^4$, for receiving the ends of the drawer-cleats. At the bottom notch a vertical slit, $B^5$, projects downward. An eye, $B^6$, projects from the inner surface of the front upright, $B'$, a short distance above the bottom.

On the lower end of the rear upright, B, a block, $A^3$, is provided, which has a dovetailed mortise or recess, $A^4$, in its top.

A cleat, $A^5$, is secured on the inner surface of each end piece, A, at the bottom edge. The end pieces, A, are united at the rear by the top and bottom bars or rails, $D'$ and D, having dovetailed tenons $D^2$ at the ends, the top rail, $D'$, being provided on its under side with hooks $D^3$, which are passed into the eyes $b$ in the dovetailed mortises $B^3$, the said dovetailed mortises receiving the tenons $D^2$ of the upper rail. The lower rail, D, is provided with a longitudinal groove in its upper edge, and the upper rail, $D'$, is provided with a longitudinal groove in its bottom edge, the said grooves receiving the top and bottom beveled edges of the rear panel-plates, E, between which an upright or post, $E'$, is erected, having vertical grooves in its side edges for receiving the beveled side edges of the panel-plates E.

The upright $E'$ is provided on its lower end with a tenon fitting in a recess in the top edge of the rail D, and with a corresponding tenon in its upper end fitting in a corresponding recess in the under side of the top rail, $D'$, as is clearly shown in Figs. 7 and 8.

On the inner surfaces of the panel-plates E, L-shaped blocks or pieces $E^2$ are secured at the outer edges, for a purpose that will be set forth hereinafter. At the front the ends A are united by a front top rail, F, (shown in detail in Fig. 13,) which has its ends notched and tongued to fit on the upper ends of the front uprights, $B'$, and against the ends of the top cleats, C.

The pins $c$ on the upper ends of the uprights $B'$ pass into apertures $c'$ in the ends of the rail F, and hooks $b^2$ on the under side of the rail F pass into the eyes $b'$ on the inner surfaces of the ends A. The end pieces are united at the bottom of their front edges by an ornamental bottom rail, $F^2$, the bottom edge of which is cut out to have a fancy contour.

Tongues $F^3$, formed on the inner surface of the rail $F^2$ and projecting beyond the end edges, are passed into the notches $B^5$ in the lower parts of the uprights $B'$, and hooks $F^4$, secured on the lower edges of the rail $F^2$ at the ends, pass into the eyes $B^6$ on the inner surfaces of the front uprights, $B'$, at the lower ends of the same. In the said frame two intermediate rails, $F^5$, are held, which are provided at the ends with dovetail tenons $F^6$, which rest against the inner dovetail surfaces of the front uprights, $B'$.

The drawer-cleats G are L-shaped in cross-section. The ends of the upright parts of each drawer-cleat G project beyond the ends of the horizontal part. The front end of each upright part of each cleat is beveled to fit against the rear bevel of the corresponding upright, $B'$, and to coincide with the bevel of the tenon $F^6$, the cleats G being placed in such a manner that the front ends of the horizontal parts rest against the back edges of the rails $F^5$, and the beveled front ends of the upright parts rest against the corresponding upright, $B'$. The inner ends of the lower horizontal parts of the cleats G abut against the L-shaped blocks $E^2$, and the inner ends of the upright parts of the cleats G rest in the recesses of the blocks $E^2$ and abut against the inner sides of the panels E. The shoulders of the ends of the rails $F^5$ pass into the notches $B^4$ in the uprights $B'$.

The top plate, H, is provided with a ledge, $H'$, projecting from the under surface along the front edge, and with two undercut L-shaped side ledges, $H^2$. The back edge of the top plate is open, and the said top plate is pushed over the skeleton frame of the bureau from the front toward the rear, the cleats or ledges $A^2$ at the top edges and on the outer surfaces of the end pieces, A, passing into the grooves in the undercut ledges $H^2$ of the plate H, thus holding the top plate, H, in place, whereby the entire frame is braced and stiffened.

The drawers J are formed in the following manner: Each drawer J is provided with a front plate, $J'$, having a vertical dovetail groove, $J^2$, in the inner surface a short distance from each end, and a longitudinal groove, $J^3$, in the inner surface parallel with and a short distance above the bottom edge. The side pieces, $J^4$, each have a strip, $J^5$, secured to the inner surface at the front edge, which strip projects beyond the front edge of the said piece $J^4$, and is provided with a dovetailed tongue adapted to be passed into the corresponding dovetailed groove, $J^2$, in the inner surface of the front plate, $J'$. In the inner surface of each side piece a vertical dovetailed groove, $j$, is formed, and along the bottom edge a groove, $j'$, is formed in the inner surface of each side piece. The vertical grooves $j$ in the side pieces are to receive the end dovetailed tongues of the back $J^6$, and the longitudinal grooves $J^3$ and $j'$ in the front $J'$ and the sides $J^4$, respectively, are to receive the longitudinal and end edges of the bottom $J^7$. A screw, $j^2$, is then passed through the bottom into the bottom edge of the back $J^6$, thus uniting the bottom and the back and holding all the parts in the proper position.

In the back edge of the top plate, H, two dovetailed notches, $H^3$, are formed for receiving the dovetailed tongues on the mirror-frame, which will now be described.

Two ornamental standards, K, have their lower ends beveled to form dovetailed tenons $K'$, which are passed into dovetailed mortises $K^2$ in the back surfaces of a bar, $K^3$, on the back of which downwardly-projecting tongues K⁴ are formed, which are passed into the dovetailed notches H³ in the top plate, H, thus holding the bar K³ and the uprights K on the top plate. Hooks k, pivoted on the back of the bar K³, are passed over the ends of headed studs k', projecting from the rear of the standards K, at the bottom ends of the same. The upper ends of the standards K are beveled to form dovetailed tenons K⁵, which are passed into dovetailed notches l l' in two top bars, L L', placed on the ends of the standards K.

An ornamental top piece, L², resting on the bar L', is provided with a bevel-ended flange, l⁴, adapted to pass between the standards K, hooks l² upon which flange catch on headed studs or pins l³, projecting from the back surfaces of the standards K at their upper ends, thus holding the top ornament, L², and the bars L L' in place on the standards. The mirror is pivoted to the standards in the usual manner.

In front of the mirror-frame one or two boxes, M, are held, each of which contains a drawer, N. The box M is formed of a top plate, M', provided on the under side with dovetailed grooves M², parallel with and a short distance from each side edge, the said grooves M² being adapted to receive the dovetailed tongues O', formed on the upper edges of the side pieces, O, having notches O² at their rear ends, to cause the said rear ends to fit on the bar K³. On the inner surface of each side piece, O, a cleat, O³, is secured, on which the drawer runs. Each side piece, O, is provided in its front lower corner with a dovetailed mortise, O⁴, in the inner surface, the said mortises being adapted to receive tongues P', formed on the ends of the cross-piece P, uniting the front lower corners of the sides O of the box M. A pin or screw is passed through the drawer-slide O³ into the top plate of the bureau to hold the box M in place. Each drawer N is formed of a front, N', having a dovetailed groove, N², formed in the inner surface along each end edge, and a transverse groove, N³, in the inner surface along and a short distance above the bottom edge.

The sides Q are provided at their front ends and on their inner surfaces with blocks Q', having dovetailed tongues projecting beyond the front ends of the sides Q, and adapted to be passed into the dovetailed grooves N² in the front N', for the purpose of holding the sides Q to the front N'. The sides are provided at their rear ends with vertical dovetailed grooves Q², formed to receive the dovetailed tongues formed on the ends of the back Q³, and the sides Q are each provided in their inner surfaces, a short distance from and parallel with the bottom edge, with a groove, Q⁴. The bottom plate, R, having beveled edges, is passed into the drawer from the rear. The side and front edges of the bottom pass into the grooves Q⁴ in the side pieces, Q, and groove N³ in the front N', respectively.

To facilitate the transportation of the knockdown furniture, it is packed in two bundles, as shown in Figs. 22 to 26, inclusive.

One bundle or package (shown in Figs. 22 and 25) is formed as follows: On the under side of the top plate, which is reversed, the ornamental bottom strip, F², the standards K of the mirror-frame, the cross-pieces K³, L, L', and L² of the mirror-frame, the top rail, F, of the skeleton frame, the sides O, the tops M', and other parts of the boxes M, are all placed in the manner shown in Fig. 22, the cleats along the edges of the top plate forming a recess for receiving the above-named parts. On the said parts two sides, J⁴, of drawers are placed, and on the same two fronts, J', and three backs, J⁶, of drawers are placed, and on the top of these one of the drawer-bottoms J⁷, and a drawer-front, J', are placed. Below the top plate, H, I place two drawer-bottoms J⁷, and then tie the parts forming this bundle together by means of ropes W, as shown in Fig. 25.

The other bundle is shown in Figs. 23, 24, 26, and is formed of the two end pieces, A, which are placed together, their outer surfaces resting against each other, and the legs of one resting against the top ledge of the other. On the inner surface of one end piece the three front rails, F⁵, the top and bottom rails, D D', and the rear middle standard, E', are placed. The space between the rail D' and the edge cleat is filled in by means of the fronts N' and the backs Q³ of the drawers N and the cross-piece P of the boxes M. On the inner surface of the other end piece, A, two drawer-sides, J⁴, and six cleats, G, are placed, and are covered by the two remaining drawer-sides J⁴. One panel, E, is placed against the open side of each end A, then all the parts are tied together by means of the ropes W, as shown in Fig. 26. The several parts forming the bureau or like piece of furniture can thus be packed very closely, and the furniture can be erected easily and rapidly. No screws, glue, or other adhesive material is required. The furniture is solid, strong, and stiff, and all the parts are securely braced and held. When knocked down, it only occupies one-third of the space it occupies when erected.

Having thus fully described my invention, I claim as new and desire to secure by Letters Patent—

1. A knockdown bureau or like piece of furniture provided with a knockdown mirror-frame adapted to be held on the said piece of furniture, substantially as herein shown and described.

2. A knockdown bureau or like piece of furniture provided with a knockdown mirror-frame and with knockdown boxes containing knockdown drawers, substantially as herein shown and described.

3. In a knockdown bureau or like piece of furniture, the combination, with the grooved bottom and top rails, D D', of the intermediate standard, E′, having a longitudinal groove in each side edge, and having tongues at the top and bottom, which tongues pass into suitable notches in the top and bottom rails, and of the panel-plates E, held between the upright E′ and the end posts of the frame, and between the top and bottom rails, D D′, substantially as herein shown and described.

4. In a knockdown bureau or like piece of furniture, the base rail or bar K³, held on the top of the bureau by dovetailed cleats K⁴, secured to the bar K³, and passing into notches in the back of the top plate of the bureau, and of a mirror-holding frame held on the said bar, substantially as herein shown and described.

5. The combination, with a knockdown bureau or like piece of furniture, of the bar K³, having dovetailed notches K², the standards K, having dovetailed top and bottom ends, and cross-pieces uniting the upper ends of the standards, substantially as herein shown and described.

6. The combination, with a knockdown bureau or like piece of furniture, of the bar K³, having dovetailed notches K², the standards K, having dovetailed top and bottom ends, the cross-pieces L L′, having the dovetailed notches $l\ l'$, and the ornamental top piece, L², substantially as herein shown and described.

7. The combination, with a knockdown bureau or like piece of furniture, of the bar K³, the standards K, the pins $l^2$, projecting from the back of the standards K, at their upper ends, the cross-pieces L L′ L², and the hooks $l^3$ on the top piece, L², substantially as herein shown and described.

8. The combination, with a knockdown bureau or other like piece of furniture, of the bar K³, the standards K, the pins $k'$, projecting from the same, and the hooks $k$ on the bar K³, substantially as herein shown and described.

9. The combination, with a knockdown bureau or other like piece of furniture, of a knockdown mirror-frame held on the same, and the knockdown boxes M, each constructed with a top, M′, and two sides, O, held on the top by dovetails and united at their front ends by a dovetailed cross-piece, P, which is held on the top plate of the bureau, substantially as herein shown and described.

JOSEPH B. BROLASKI.

Witnesses:
FRANK MILLER,
CORNELIUS J. VOORHIS.